United States Patent [19]

Waggoner

[11] Patent Number: 4,582,869
[45] Date of Patent: Apr. 15, 1986

[54] POLYOXYMETHYLENE/POLYURETHANE COMPOSITIONS CONTAINING ETHYLENE BIS-STEARAMIDE

[75] Inventor: Marion G. Waggoner, Hockessin, Del.

[73] Assignee: E. I. Du Pont de Nemours and Company, Wilmington, Del.

[21] Appl. No.: 579,911

[22] Filed: Feb. 21, 1984

Related U.S. Application Data

[63] Continuation-in-part of Ser. No. 469,758, Feb. 25, 1983, abandoned.

[51] Int. Cl.$^4$ .................. C08K 5/20; C08L 75/04; C08L 75/06; C08L 59/04
[52] U.S. Cl. .................. 524/227; 524/195; 524/539; 524/542; 525/399; 264/328.16
[58] Field of Search .................. 524/227, 542, 539; 525/399; 264/328.16

[56] References Cited

U.S. PATENT DOCUMENTS

| | | | |
|---|---|---|---|
| 3,116,267 | 12/1963 | Dolce | 524/227 |
| 3,236,929 | 2/1966 | Jupa et al. | 264/328 |
| 3,382,202 | 5/1968 | Forrester | 524/227 |
| 3,850,873 | 11/1974 | Wurmb | 524/542 |
| 4,277,577 | 7/1981 | Burg | 525/399 |

FOREIGN PATENT DOCUMENTS

| | | | |
|---|---|---|---|
| 683009 | 3/1964 | Canada | 525/399 |
| 116456 | 8/1984 | European Pat. Off. | |
| 117664 | 9/1984 | European Pat. Off. | |
| 81/03027 | 10/1981 | PCT Int'l Appl. | 525/399 |
| 1017244 | 1/1966 | United Kingdom | 525/399 |

*Primary Examiner*—C. Warren Ivy

[57] ABSTRACT

Polyoxymethylene/thermoplastic polyurethane compositions having 5–40 weight percent polyurethane are modified by incorporating therein 0.2–1.0 weight percent ethylene bis-stearamide to improve mold release and mold deposit.

20 Claims, No Drawings

POLYOXYMETHYLENE/POLYURETHANE COMPOSITIONS CONTAINING ETHYLENE BIS-STEARAMIDE

CROSS-REFERENCE TO RELATED APPLICATION

This application is a continuation-in-part of copending U.S. patent application Ser. No. 469,758, filed Feb. 25, 1983, now abandoned.

TECHNICAL FIELD

This invention relates to certain polyoxymethylene compositions which are characterized by improved mold release and reduced mold deposit characteristics. Polyoxymethylene compositions are generally understood to include compositions based on homopolymers of formaldehyde or of cyclic oligomers of formaldehyde, for example trioxane, the terminal groups of which are end-capped by esterification or etherification, as well as copolymers of formaldehyde or of cyclic oligomers of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high molecular weight, i.e. 20,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished products made from such compositions possess extremely desirable physical properties, including high stiffness, strength and solvent resistance. Polyoxymethylene compositions have been recently developed containing 5–40 weight percent of certain thermoplastic polyurethanes and having extraordinary toughness and/or impact resistance. However it has been discovered that such polyoxymethylene/polyurethane compositions exhibit mold sticking and/or mold deposit under certain conditions. This invention relates to improved polyoxymethylene/polyurethane compositions in which the mold sticking and mold release problems have been significantly reduced or eliminated.

BACKGROUND ART

U.S. patent application Ser. No. 464,412, filed Feb. 7, 1983 by E. A. Flexman, now abandoned, and its copending continuation-in-part U.S. patent application Ser. No. 570,036, filed Jan. 16, 1984, discloses polyoxymethylene compositions having extraordinary impact resistance i.e. a Gardner impact value (measured according to ASTM D-3029, Method G, Geometry D using a 3.6 kg (8 pound) weight and injection molded 7.62×12.7×0.16 cm (3×5×1/16 inch) plaques of greater than 9 J (80 in-lb), which compositions consist essentially of
 (a) 5–15 weight percent of at least one thermoplastic polyurethane, which polyurethane has a glass transition temperature of lower than 0° C., and
 (b) 85–95 weight percent of at least one polyoxymethylene polymer, which polyoxymethylene polymer has a molecular weight of from 20,000 to 100,000,
the above-stated percentages being based on the total amount of components (a) and (b) only, the thermoplastic polyurethane being dispersed throughout the polyoxymethylene polymer as discrete particles, and the composition having a Gardner impact value of greater than 9 J.

U.S. patent application Ser. No. 464,411, filed Feb. 7, 1983 by E. A. Flexman, now abandoned, and its copending continuation-in-part U.S. patent application Ser. No. 570,037, filed Jan. 16, 1984, discloses polyoxymethylene compositions having extraordinary toughness i.e. a notched Izod value (measured according to ASTM D-256, Method A) of greater than 375 J/m (7.0 ft-lb/in), which compositions consist essentially of
 (a) greater than 15 weight percent and not more than 40 weight percent of at least one thermoplastic polyurethane, which polyurethane has a glass transition temperature of lower than −15° C., and
 (b) at least 60 weight percent and less than 85 weight percent of at least one polyoxymethylene polymer, which polyoxymethylene polymer has a molecular weight of from 20,000 to 100,000,
the above-stated percentages being based on the total amount of components (a) and (b) only, the thermoplastic polyurethane being dispersed throughout the polyoxymethylene polymer as a separate phase having an average cross-sectional size in the minimum dimension of not greater than 0.9 microns, and the composition having an Izod value of greater than 375 J/m.

The polyoxymethylene compositions disclosed in these two copending applications are compositions which can be improved by the present invention to give polyoxymethylene compositions characterized by improved mold release and reduced mold deposit characteristics.

U.S. Pat. No. 3,236,929, granted Feb. 22, 1966 to Jupa et al., discloses various compounds that are generally added to polyoxymethylene compositions to improve mold release characteristics of such compositions. Among the compounds disclosed as suitable for this purpose are long-chain aliphatic amides, e.g. ethylene bis-stearamide. However the polyoxymethylene compositions disclosed in this patent do not contain any thermoplastic polyurethane, and one can not extrapolate from polyoxymethylene compositions not containing any polyurethane to those containing 5–40 weight percent polyurethane with respect to additives for improving mold release and reducing mold sticking. This is evidenced by the fact that many of the mold release agents disclosed in the reference for use in polyoxymethylene compositions not containing any polyurethane are not suitable for use in polyoxymethylene compositions containing 5–40 weight percent polyurethane.

DISCLOSURE OF THE INVENTION

This invention relates to certain polyoxymethylene compositions which are characterized by improved mold release and reduced mold deposit characteristics. The term "polyoxymethylene" as used herein includes homopolymers of formaldehyde or of cyclic oligomers of formaldehyde, the terminal groups of which are end-capped by esterification or etherification, and copolymers of formaldehyde or of cyclic oligomers of formaldehyde with oxyalkylene groups with at least two adjacent carbon atoms in the main chain, the terminal groups of which copolymers can be hydroxyl terminated or can be end-capped by esterification or etherification.

It has been found that toughened and/or impact resistance polyoxymethylene compositions consisting essentially of (a) 5-40 weight percent of at least one thermoplastic polyurethane, which polyurethane has a glass transition temperature of lower than 0° C., and (b) 60-95 weight percent of at least one polyoxymethylene polymer, which polyoxymethylene polymer has a molecular weight of from 20,000 to 100,000.

the above-stated percentages being based on the total amount of components (a) and (b) only, will exhibit mold sticking and/or mold deposit under certain conditions.

It has been further been found that the mold sticking and mold deposit characteristic of such polyoxymethylene/polyurethane compositions can be significantly reduced or eliminated by incorporating into such polyoxymethylene/polyurethane compositions a small quantity of ethylene bis-stearamide. More specifically, it has been found that the mold sticking and mold deposit characteristic of such polyoxymethylene/polyurethane compositions can be significantly reduced or eliminated by blending with such polyoxymethylene/polyurethane compositions 0.2-1.0 weight percent of ethylene bis-stearamide.

It has further been found that this small quantity of ethylene bis-stearamide will be effective in reducing mold sticking and mold deposit characteristic of such polyoxymethylene/polyurethane compositions, if it is incorporated into such polyoxymethylene/polyurethane compositions at any time prior to molding of such compositions. That is, the ethylene bis-stearamide can be blended with the polyoxymethylene, followed by blending the polyurethane with the polyoxymethylene/ethylene bis-stearamide mixture. Alternatively, the ethylene bis-stearamide can be blended with the polyurethane, followed by blending the polyoxymethylene with the polyurethane/ethylene bis-stearamide mixture. Alternatively, the polyoxymethylene can be blended with polyurethane, followed by blending the ethylene bis-stearamide with the polyoxymethylene/polyurethane mixture. Alternatively, all three of these ingredients may be blended simultaneously. All that is required is that the ethylene bis-stearamide be reasonably evenly distributed throughout the polyoxymethylene/polyurethane composition.

It has further been found that of the many and varied compounds that are known to be useful for reducing mold sticking and mold deposit of polyoxymethylene compositions containing no polyurethane, only ethylene bis-stearamide will significantly reduce or eliminate mold sticking and mold deposit of the polyoxymethylene/polyurethane compositions described above.

It has further been found that the amount of mold sticking and/or mold deposit in such polyoxymethylene/polyurethane compositions increases as the quantity of polyurethane in such compositions increases, and accordingly, the quantity of ethylene bis-stearamide necessary to significantly reduce or eliminate mold sticking and mold deposit in such compositions will also increase as the quantity of polyurethane in such compositions increases. In any event, amounts of ethylene bis-stearamide greater than about 1.0 weight percent seem to offer little additional benefit. Similarly, amounts of ethylene bis-stearamide less than about 0.2 weight percent do not seem to offer significant improvement in the mold sticking and mold deposit characteristic of the polyoxymethylene/polyurethane compositions described above.

It has further been found that the small quantity of ethylene bis-stearamide used in the compositions of the present invention has the additional benefit of increasing the toughness of these compositions as measured by elongation and Izod standard tests.

Accordingly, compositions of the present invention will consist essentially of (a) 5-40 weight percent of at least one thermoplastic polyurethane, which polyurethane has a glass transition temperature of lower than 0° C., (b) 0.2-1.0 weight percent of ethylene bis-stearamide, and (c) a complemental amount of at least one polyoxymethylene polymer, which polyoxymethylene polymer has a weight average molecular weight of from 20,000 to 100,000.

Various other ingredients, modifiers and/or additives can be included in the compositions of the present invention without significantly altering the essential features of the present invention as described herein.

For compositions containing 5-15 weight percent polyurethane, such as described in copending U.S. Ser. No. 464,412, perferably the Gardner impact value will be greater than 9 J (80 in-lb), more preferably greater than 17 J (150 in-lb), and most preferably greater than 25 J (225 in-lb). For compositions containing 15-40 weight percent polyurethane, such as described in copending U.S. Ser. No. 464,411, preferably the Izod value will be greater than 375 J/m (7.0 ft-lb/in), more preferably greater than 500 J/m (9.4 ft-lb/in), and most preferably greater than 650 J/m (12.2 ft-lb/in).

For compositions containing 5-15 weight percent polyurethane, such as described in copending U.S. Ser. No. 464,412; it is preferred to incorporate therein 0.2-0.4 weight percent ethylene bis-stearamide. More preferably 0.2 to 0.3 weight percent for the more preferred compositions containing 8-12 weight percent polyurethane, and most preferably about 0.25 weight percent ethylene bis-stearamide for the most preferred compositions containing about 10 weight percent polyurethane. For compositions containing 15-40 weight percent polyurethane, such as described in copending U.S. Ser. No. 464,411, it is preferred to incorporate therein 0.3-1.0 weight percent ethylene bis-stearamide, more preferably 0.7-0.9 weight percent for the more preferred compositions containing 20-35 weight percent polyurethane, and most preferably about 0.8 weight percent for the most preferred compositions containing 25-32 weight percent polyurethane. The preferences stated in this paragraph are based on both technological and economic consideration.

It has further been found that incorporation of 0.2-1.0 weight percent ethylene bis-stearamide into the polyoxymethylene/polyurethane compositions described above does not adversely affect the other important physical properties of such polyoxymethylene/polyurethane compositions, including extraordinary toughness and/or impact resistance and high stiffness, strength, chemical stability and solvent resistance.

It should be noted that, with respect to compositions containing 5-15 weight percent polyurethane, for compositions having extraordinary impact resistance the polyoxymethylene polymer can be branched or linear and must have a weight average molecular weight in the range of 20,000 to 100,000, preferably 25,000 to 90,000, more preferably 30,000 to 70,000, and most preferably 35,000 to 40,000.

As an alternative to characterizing the polyoxymethylene by its molecular weight, it can be characterized by its melt flow rate. Polyoxymethylenes which are preferred for compositions having extraordinary impact resistance will have a melt flow rate (measured according to ASTM D-1238, Procedure A, Condition G with a 1.0 mm (0.0413 inch) diameter orifice) of 0.1–30 grams/10 minutes. Preferably, the melt flow rate of the polyoxymethylene will be from 0.5–10 grams/10 minutes, most preferably about 5 grams/10 minutes for homopolymer and about 9 grams/10 minutes for copolymer.

As indicated above, the polyoxymethylene can be either a homopolymer, a copolymer or a mixture thereof. Copolymers can contain one or more comonomers generally used in preparing polyoxymethylene compositions. Comonomers more commonly used include alkylene oxides of 2–12 carbon atoms. If copolymer is selected, the quantity of comonomer will be not more than 20 weight percent, preferably not more than 15 weight percent, and most preferably about 2 weight percent. The most preferred comonomer is ethylene oxide, and preferred polyoxymethylene copolymers are dipolymers of formaldehyde and ethylene oxide where the quantity of ethylene oxide is about 2 weight percent. Generally, polyoxymethylene homopolymer is preferred over copolymer. The most preferred homopolymers for use in compositions having extraordinary impact resistance are those with a molecular weight of about 38,000 and those with terminal hydroxyl groups which have been end-capped by a chemical reaction to form ester or ether groups, preferably acetate or methoxy groups, respectively.

Thermoplastic polyurethanes preferred for use in compositions having extraordinary impact resistance can be selected from those commercially available or can be made by processes known in the art. (See, for example, Rubber Technology, 2nd edition, edited by Maurice Morton (1973), Chapter 17, Urethane Elastomers, D. A. Meyer, especially pp. 453–6). Polyurethanes are derived from the reaction of polyester or polyether polyols with diisocyanates and optionally also from the further reaction of such components with chain-extending agents such as low molecular weight polyols, preferably diols. Polyurethane elastomers are generally composed of soft segments, for example polyether or polyester polyols, and hard segments, derived from the reaction of the low molecular weight diols and diisocyanates. While a polyurethane elastomer with no hard segments can be used, those most useful will contain both soft and hard segments.

In the preparation of the thermoplastic polyurethanes, preferred for use in compositions having extraordinary impact resistance, a polymeric soft segment material having at least two hydroxyl groups per molecule and having a molecular weight of at least about 500 and preferably from about 550 to about 5,000 and most preferably from about 1,000 to about 2,500, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08, more preferably 0.95 to 1.05, and most preferably, 0.95 to ?1.00.

Suitable polyester polyols include the polyesterification products of one or more dihydric alcohols with one or more dicarboxylic acids. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof. Suitable dihydric alcohols include ethylene glycol, propylene glycol, 1,4-butanediol, 1,3-butanediol, 2-methyl pentane diol-1,5, diethylene glycol, pentanediol, hexanediol and mixtures thereof.

Further, hydroxycarboxylic acids, lactones, and cyclic carbonates, such as caprolactone and hydroxybutyric acid can be used in the preparation of the polyester.

Preferred polyesters include poly(ethylene adipate), poly(1,4-butylene adipate), mixtures of these adipates and polycaprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol, and mixtures thereof. Suitable alkylene oxide condensates include those of ethylene oxide, 1,2-propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols drived from ethylene oxide, propylene oxide, and/or tetrahydrofuran (THF). Alternatively, a THF polyether copolymer with minor amounts of 3-methyl THF can also be used.

Preferred polyethers include polytetramethylene ether glycol (PTMEG), polypropylene oxide, copolymers of propylene oxide and ethylene oxide, and copolymers of tetrahydrofuran and ethylene oxide.

Suitable organic diisocyanates include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, isomeric mixtures of 2,4- and 2,6-tolylene diisocyanate, 4,4'-methylene bis(phenylisocyanate), 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate and 1-chlorobenzene-2,4-diisocyanate. 4,4'-Methylene bis(phenylisocyanate), 1,6-hexamethylene diisocyante, 4,4'-dicyclohexylmethane diisocyanate and 2,4-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-a-glyceryl ether, 1,3-propanediol, 1,3-butanediol, 2,2-dimethyl-1,3-propanediol, 2,2-diethyl-1,3-propanediol, 2-ethyl-2- butyl-1,3-propanediol, 2-methyl-2,4-pentanediol, 2,2,4-trimethyl-1,3-pentanediol, 2-ethyl-1,3-hexanediol, 1,4-butanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1,3-propanediol, dihydroxyethyl ether of hydroquinone, hydrogenated bisphenol A, dihydroxyethyl terephthalate and dihydroxymethyl benzene and mixtures thereof. 1,4-butane diol, 1,2-ethane diol and 1,6-hexane diol are preferred.

In the preparation of the thermoplastic polyurethanes the ratio of isocyanate to hydroxyl should be close to unity, and the reaction can be a one step or a two step reaction. Catalyst can be used, and the reaction can be run neat or in a solvent.

Apart from what is described above concerning selection of the polyurethane, the most important characteristic of the thermoplastic polyurethane with respect to obtaining compositions having extraordinary impact resistance is its glass transition temperature (Tg). Wherever a glass transition temperature is reported herein, it is as determined using a Du Pont Model 981 Dynamic Mechanical Analysis Cell attached to a Model 990 Thermal Analyzer. The cell is modified to use liquid nitrogen as the coolant and to allow the use of a 3.2 cm (1.25 inch) gap holding the specimen. The oscillation amplitude is set at 0.2 mm. A heating rate of 2.5° C./min is used from −170° C. to 0° to 40° C. depending on the signal amplitude. Readings are taken every 1° C. increment. The storage and loss moduli are plotted and the major loss modulus peak is defined as the soft segment glass transition temperature. Compositions having extraordinary impact resistance can best be made when the soft segment glass transition temperature of the thermoplastic polyurethane is less than 0° C. Preferably, the soft segment glass transition temperature of the polyurethane should be less than −10° C., more preferably below −15 C., and most preferably below −30° C. Combinations or mixtures of thermoplastic polyurethanes can also be used.

For compositions having extraordinary impact resistance the molecular weight of the soft segment of the thermoplastic polyurethane should average between about 500 and about 5000, preferably about 850–3000, more preferably about 1000–2500, with the most preferred polyurethanes having soft segments with an average molecular weight of about 2000.

Similarly, for compositions having extraordinary impact resistance, the moisture content of the composition, and of the polyurethane, should be less than 0.2 percent by weight of water, preferably less than 0.1 percent, especially when there is no opportunity for the water to escape, for example during injection molding.

For compositions having extraordinary impact resistance the polyurethane must be intimately mixed and dispersed as discrete particles in the polyoxymethylene, and it must be maintained in that state during the formation of the finished products.

Any intensive mixing device capable of developing high shear at temperatures above the melting points of the ingredients can be used to disperse the polyurethane in the polyoxymethylene and to incorporate the ethylene bis-stearamide into the polyoxymethylene/polyurethane compositions. Examples of such devices include rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing such as valves, gates or screws designed for this purpose. Continuous devices are preferred. Twin screw extruders are especially preferred, particularly those incorporating high intensity mixing sections such as reverse pitch elements and kneading elements. The mixing device used in all of the examples of the present application unless noted otherwise was a 28 mm co-rotating Werner and Pfleiderer twin screw extruder, using a screw design containing two working sections with a total of five kneading elements, two reverse elements, and a vacuum port at about 70% of the distance from the feed throat to the die. All zones were set at 190° C. Temperature of the melt coming out of the die was about 220°–260° C. A low flow of cooling water was used to reduce temperatures in some cases. The extruder was operated at 200–250 rpm with 6.8–13.6 kg (15–30 pounds) per hour throughput. A nitrogen blanket was maintained over the feed throat to exclude oxygen and preserve dryness of the ingredients, and the strand exiting the die was quenched in water and cut into pellets. One can deviate from those conditions. For example melt temperatures below 190° C. or higher than 260° C. are possible if throughput is adjusted to compensate. However, 170°–260° C. is considered preferred, with 185°–240° C. preferred, and 200°–230° C. most preferred for melt compounding.

For compositions having extraordinary impact resistance it is important to maintain the conditions created in the melt compounded material, such as distribution of the thermoplastic polyurethane as discrete particles in the polyoxymethylene, dryness of the composition, etc. Shaped articles made from the compositions of the present invention can be made by any of several common methods, including compression molding, injection molding, extrusion blow molding, rotational molding, thermoforming and stamping. Such shaped articles can be post treated by orientation, stretching, coating, annealing, painting, laminating and plating. Unused shaped articles, rejected shaped articles or waste composition of the present invention can be ground and remolded.

Generally, the conditions used in the preparation of shaped articles will be similar to those described above for melt compounding. More specifically, melt temperatures and residence times can be used up to the points at which significant degradation of the composition occurs. Preferably, the melt temperature will be about 170°–250° C., more preferably about 185°–240° C., and most preferably about 200°–230° C. When injection molding the compositions of the present invention, it is preferable that the mold be as cold as possible consistent with the intricacy of the shape being produced. However, colder molds are harder to fill, particularly where the passages may be narrow or the shape is intricate. Generally, the mold temperature will be 10°–120° C., preferably 10°–100° C., and most preferably the mold temperature will be about 50°–90° C. Similarly, the cycle time, which determines the total hold-up time in the melt, can be adjusted to fit the particular conditions being encountered. For example, if the total hold-up time in the melt is too long, the composition can degrade. If the cycle time is too short, the shaped article may not totally solidify while the mold is still under pressure. Generally, total hold-up time in the melt will be about 3–15 minutes, with the shorter times being preferred, consistent with giving a high quality shaped article.

The preferences stated above with respect to the preparation of compositions containing 5–15 weight percent polyurethane and having extraordinary impact resistance will hold for the preparation of compositions containing >15–40 weight percent polyurethane and having extraordinary toughness except as specified below. Certain additional preferences stated below will apply to the preparation of compositions containing >15–40 weight percent polyurethane and having extraordinary toughness.

For compositions having extraordinary toughness the polyoxymethylene polymer will preferably have a weight average molecular weight in the range of 20,000 to 100,000, preferably 25,000 to 90,000, more preferably 30,000 to 70,000, and most preferably 60,000–70,000.

As an alternative to characterizing the polyoxymethylene by its weight average molecular weight, it can be characterized by its melt flow rate. Polyoxymethylenes which are preferred for compositions having extraordinary toughness will have a melt flow rate (measured according to ASTM D-1238, Procedure A, Condition G with a 1.0 mm (0.0413 inch) diameter orifice) of 0.1–30 grams/10 minutes. Preferably, the melt flow rate of the polyoxymethylene used in the compositions of the present invention will be from 0.5–10 grams/10 minutes. The most preferred polyoxymethylenes are linear polyoxymethylenes with a melt flow rate of about 1 gram/10 minutes or branched polyoxymethylenes with a melt flow rate of less than 1 gram/10 minutes polyoxymethylene homopolymer is preferred. The most preferred homopolymers for use in compositions having extraordinary toughness are those with a molecular weight of about 65,000 and those with terminal hydroxyl groups which have been end-capped by a chemical reaction to form ester or ether groups, preferably acetate or methoxy groups, respectively. For compositions having extraordinary toughness the polyoxymethylene polymer will comprise the continuous phase of such compositions and the thermoplastic polyurethane will be dispersed throughout the continuous phase polyoxymethylene. The thermoplastic polyurethane can comprise discrete particles dispersed throughout the polyoxymethylene continuous phase, and this configuration is most commonly found when the proportion of polyurethane in the composition is relatively low. These particles of polyurethane can be approximately spherical in shape (i.e. the particles will have an aspect ratio approximately equal to 1.0) or elongated (i.e. the particles will have an aspect ratio substantially greater than 1.0), and their size distribution can be Gaussian, bi- or polymodal, or other. If elongated, they can be only slightly elongated and approximately oval in shape, or they can be greatly elongated and resemble strands of thermoplastic polyurethane running through the polyoxymethylene continuous phase. In fact it is possible for such strands to run continously the full length of an article made from such compositions. Alternatively, such strands can be interconnected so as to form a network of thermoplastic polyurethane particles throughout the polyoxymethylene continuous phase, and this configuration is most commonly found when the proportion of polyurethane in the composition is relatively high.

It has been observed that when the polyurethane phase is elongated, the direction of elongation is generally the same for all the phase and is generally in the direction of the shear applied during the final stage of the preparation of the composition while still in its molten state. For example, in the preparation of such compositions in a rod shape by melt compounding in a twin-screw extruder, followed by passage through a round die and quenching in water, the elongation, if any, of the thermoplastic polyurethane will generally run parallel to the axis of the rod. It has been found most useful for the purpose of characterizing such compositions to measure average cross-sectional size of the polyurethane phase in a plane perpendicular to the direction of elongation of the thermoplastic polyurethane particles and in the center of the formed article.

Average cross-sectional size is measured by the following technique. A "Sorvall" MT-2B ultra-microtome equipped with a diamond knife and a "Sorvall-Christensen" FTS-LTC-2 sectioner, operating at −90° C., is used to cut sections 200 nanometers thick from the center area of a molded 0.32×1.27×12.7 cm ($\frac{1}{8}$×$\frac{1}{2}$×5 in) bar perpendicular to the bar axis. Ethanol is used as a knife lubricant and a number of slices are collected and then placed a petri dish containing distilled water. The mixing action of the ethanol and water spreads the microtomed slices apart and allows them to float on the top of the water. The microtomed slices are placed on a 200 mesh copper microscope grid. Electron photomicrographs of typical areas are photographed at 2500X using a Zeiss EM10A electron microscope at 80 KV equipped with a 70 mm roll film camera and Eastman 5302 film. Darkroom enlargements of the microscope negatives results in final 20.3×25.4 cm (8×10 in) photomicrographs at 11,800X.

Two 10.2×12.7 cm (4×5 in) pieces are cut from each 20.3×25.4 cm (8×10 in) photomicrograph with the 12.7 cm (5 in) edge of each piece parallel to the preferential direction, if any, in which most of the polyurethane was oriented. Most photomicrographs have such a direction. Each photomicrograph is scanned across the short dimension one row at a time by a flying spot scanner 200 microns square. This photomicrograph line of spots appears as a pattern of light and dark areas with varying levels of grey between them. The average density of this line is calculated. All images darker (more dense) than this average value are considered to be the thermoplastic polyurethane phase. Conversely all images lighter than this line are considered to be the polyoxymethylene matrix. The mean length of the up pulses (dark areas or thermoplastic polyurethane phase) is calculated. This measure is referred to hereinafter as the average cross-sectional size in the minimum dimension.

Compositions having extraordinary toughness can be made when the average cross-sectional size of the thermoplastic polyurethane is not greater than 0.9 microns. Preferably the average cross-sectional size of the thermoplastic polyurethane will be less than 0.7 microns, most preferably less than 0.5 microns. As a practical matter, the polyurethane phase should also have an average cross-sectional size of at least 0.01 microns.

Apart from what is described above concerning selection of the polyurethane, the most important characteristic of the thermoplastic polyurethane with respect to obtaining compositions having extraordinary toughness is its soft segment glass transition temperature (Tg).

Compositions having extraordinary toughness can best be made when the soft segment glass transition temperature of the thermoplastic polyurethane is less than −15° C. Preferably, the soft segment glass transition temperature of the polyurethane should be less than −20° C. and most preferably below −30° C. Combinations or mixtures of thermoplastic polyurethanes can also be used. For compositions having extraordinary toughness one should generally use a thermoplastic polyurethane with an inherent viscosity of 0.7 or above (as measured by ASTM D-2857 with a "Schott" automatic viscometer at 0.1% polyurethane in dimethyl formamide at 30° C.). Thermoplastic polyurethanes having inherent viscosities up to 2.7 have been used successfully in such compositions, but those having inherent viscosities of 0.75-2.5 are generally preferred, with those having inherent viscosities of 1.0-1.7 being most preferred. Alternatively, it is possible to start with a polyurethane having a very low inherent viscosity, and then modify it during the blending operation, e.g. by further polymerization or cross-linking, thus increasing the effective viscosity of the polyurethane to a desirable level, even though the inherent viscosity of the starting material polyurethane was quite low. Alternatively, one could begin with a polyurethane having a higher inherent viscosity and degrade or hydrolyze it during compounding to obtain the desired effective viscosity.

In the following examples, there are shown specific embodiments of the present invention and certain side-by comparisons with embodiments of control experiments with compositions containing a compound generally used to reduce mold sticking and mold deposit of polyoxymethylene compositions not containing any polyurethane, said compound being other than ethylene bis-stearamide. It will be seen that the compositions of the present invention are characterized by significantly reduced or eliminated mold sticking and mold deposit, while the control compositions are not. All parts and percentages are by weight, and all temperatures are in degrees Celsius unless otherwise specified. Measurements not originally in SI units have been so converted and rounded where appropriate.

In each of the following examples, molding of the blends to determine mold sticking and mold deposit was conducted with a 125 ton Spartan injection molding machine manufactured by HPM, Inc. This unit was equipped with a screw injection unit having a 4.5 cm (1.75 inch) diameter screw. Plaques 0.32 cm (⅛ inch) thick were molded at cylinder temperatures of 176°–197° C., cycles (injection/hold) of 15/15 seconds, 20/15 seconds and 30/15 seconds. The procedure throughout was to purge the machine with each example, to clean the mold of all deposit with a slurry of alumina in water, and then to mold 30 shots on cycle unless the parts stuck so severly that the machine had to be stopped to remove the parts, in which case no further molding of that example was attempted.

All of Examples 1–25 were based on blends of 30 weight percent of a thermoplastic polyurethane having an inherent viscosity of 1.33, a glass transition temperature of −35° C., and a chemical composition of 37 weight percent adipic acid, 39 weight percent butane diol, and 24 weight percent methylene bisphenyl isocyanate, 0.75 weight percent of a polyamide stabilizer (terpolymer of approximately 38% polycaprolactam/35% polyhexamethylene adipamide/27% polyhexamethylene sebacamide), 0.11 weight percent of 2,2′-methylene bis(6-t-butyl-4-methyl phenol)antioxidant, lubricant and polycarbodiimide as specified in Table I, and a complemental amount of acetate end-capped polyoxymethylene homopolymer (prepared according to U.S. Pat. No. 2,998,409) having a weight average molecular weight of about 63,000. In addition to varying the quantity and type of lubricant as indicated in Table I, certain compositions (as indicated in Table I) contained 0.1 weight percent (except for control Example Number 2 which had 0.3 weight percent) of a polycarbodiimide (or a mixture of polycarbodiimides) having a molecular weight of about 1000 and containing units of the formula

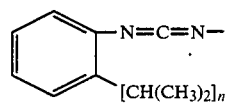

where n has an average value of about 3.

In Table I, all data is reported for a 0.32 cm (⅛ inch) plaque mold, with 100° C. mold surface temperature. The term "delamination" refers to a surface defect produced when parts which are stuck to the mold surface are mechanically forced from the mold by ejector pins, thus forming a partially detached thin layer.

It should be noted that the polyurethane used in all of the following examples was a commercial product that contained 0.6 weight percent ethylene bis-stearamide. Accordingly, compositions containing 30 weight percent polyurethane will contain about 0.18 weight percent ethylene bis-stearamide plus whatever quantity and type of lubricant is indicated in the Table. Thus, the values listed in the Table under "% Added Lubricant" do not include the 0.18% ethylene bis-stearamide that enters the compositions tested via the polyurethane. Similarly, in Example 26, which contains 10 weight percent polyurethane, 0.06% ethylene bis-stearamide is added via the polyurethane. Example 26 recites only the added lubricant. However, at all other places in this application, including in the claims, the amount of ethylene bis-stearamide recited is the total amount, including any amount that may be incorporated via the polyurethane.

TABLE 1

| Example | Lubricant | % Added Lubricant | Polycarbodiimide (%) | Molding Performance | | |
|---|---|---|---|---|---|---|
| | | | | Sticking | Delamination | Deposit |
| 1 | None | — | 0 | Yes | Yes | Yes, after 30 shots |
| 2 | None | — | 0.3 | Yes, totally stuck on shot #16 | No | yes |
| 3 | ethylene-bis-stearamide | 0.5 | 0 | No | No | slight |
| 4 | pentaerythritol tetra- | 0.5 | 0 | Yes | Yes | severe |

TABLE 1-continued

| Example | Lubricant | % Added Lubricant | Polycarbo-imide (%) | Molding Performance Sticking | Delamination | Deposit |
|---|---|---|---|---|---|---|
| | stearate | | | | | |
| 5 | polyethylene glycol | 1.5 | 0 | No | Yes | moderate |
| 6 | silicone oil | 1.0 | 0 | Decomposed/stuck | — | — |
| 7 | polyethylene wax | 1.0 | 0 | Totally stuck on shot #5 | — | — |
| 8 | stearyl erucamide | 0.3 | 0.1 | No | Yes | moderate |
| 9 | stearyl erucamide | 0.6 | 0.1 | No | severe | moderate |
| 10 | polyethylene wax | 2.0 | 0.1 | No | severe | — |
| 11 | alkyl phthalate | 1.0 | 0.1 | No | severe | severe |
| 12 | benzyl phthalate | 1.0 | 0.1 | No | severe | slight |
| 13 | benzene sulfonamide | 1.0 | 0.1 | No | severe | moderate |
| 14 | neopentyl glycol dibenzoate | 1.0 | 0.1 | No | severe | heavy |
| 15 | N,N'erucyl adipamide | 1.0 | 0.1 | No | Yes | slight |
| 16 | polyethylene glycol bis-2-ethylhexanoate | 1.0 | 0.1 | | Yes | very slight |
| 17 | ethylene bis-stearamide | 0.3 | 0.1 | No | No | moderate |
| 18 | ethylene bis-stearamide | 0.4 | 0.1 | No | No | slight |
| 19 | ethylene bis-stearamide | 0.5 | 0.1 | No | No | slight |
| 20 | ethylene bis-stearamide | 0.6 | 0.1 | No | No | slight (haze on mold) |
| 21 | ethylene bis-stearamide | 0.8 | 0.1 | No | No | slight (haze on mold) |
| 22 | ethylene bis-stearamide | 1.0 | 0.1 | No | No | slight (haze on mold) |
| 23 | ethylene bis-stearamide | 1.25 | 0.1 | No | No | slight (haze on mold) |
| 24 | ethylene glycol distearate | 0.6 | 0.1 | No | severe | heavy |
| 25 | ethylene bis-oleamide | 0.6 | 0.1 | No | Yes | heavy |

EXAMPLE 26

A sample was prepared for evaluation containing 10 weight percent of the same thermoplastic polyurethane used in Examples 1-25, 0.75 weight percent of the same polyamide stabilizer, 0.11 weight percent of the same antioxidant, 0.1 weight percent of the same polycarbodiimide, 0.2 weight percent added ethylene bis-stearamide and a complemental amount of acetate endcapped polyoxymethylene homopolymer having a weight average molecular weight of about 38,000. It was evaluated for mold sticking and deposit against a compositions as described above, but with no added ethylene bis-stearamide. Neither resin showed mold deposit. The sample with added ethylene bis-stearamide showed little mold sticking, while the sample with no added ethylene bis-stearamide showed considerable sticking in hot molds.

EXAMPLES 27-41

A series of experiments was conducted to evaluate the effect of ethylene bis-stearamide on the elongation and Izod values of the compositions of the present invention. Compositions were prepared substantially as described for Examples 1-25 except as noted in the following table. Tensile strength was measured in accord with ASTM-D-638; elongation was measured in accord with ASTM-D-638; and Izod was measured in accord with ASTM-D-256. Antioxidant A was 4,4'-butylidene bis(6-t-butyl-3-methylphenol) and antioxidant B as 1,6-hexamethylene bis(3,5-di-tert-butyl-4-hydroxyhydro cinnamate). All compositions contained 0.1% antioxidant.

TABLE I

| Example | Ethylene bis-stearamide (%) | Anti-Oxidant | Tensile (MPa) | Elongation (%) | Izod J/m |
|---|---|---|---|---|---|
| 27 | 0 | A | 42.0 | 200 | 1015 |
| 28 | 0.3 | A | 42.0 | 230 | 961 |
| 29 | 0.6 | A | 42.0 | 205 | 1175 |
| 30 | 0 | A | 42.7 | 135 | 908 |
| 31 | 0.2 | A | 42.7 | 140 | 1015 |
| 32 | 0.4 | A | 42.0 | 205 | 1121 |
| 33 | 0.6 | A | 40.7 | 185 | 1282 |
| 34 | 0 | B | 44.1 | 110 | 534 |
| 35 | 0.6 | B | 40.7 | 245 | 854 |
| 36 | 0 | B | 42.7 | 175 | 908 |
| 37 | 0.6 | B | 42.0 | 205 | 1015 |
| 38 | 0 | B | 42.0 | 280 | 961 |
| 39 | 0.6 | B | 41.4 | 260 | 961 |
| 40 | 0 | B | 42.7 | 135 | 934 |

TABLE I-continued

| Example | Ethylene bis-stearamide (%) | Anti-Oxidant | Tensile (MPa) | Elongation (%) | Izod J/m |
|---|---|---|---|---|---|
| 41 | 0.6 | B | 41.4 | 190 | 1041 |

INDUSTRIAL APPLICABILITY

The polyoxymethylene compositions of the present invention are useful in the manufacture of finished articles such as sports helmets, safety helmets, shoe cleats, safety steering column components, specialty zippers, railroad tie insulators, ski bindings, mechanical conveyors and small engine components. The extraordinary impact resistance and/or toughness and exceptional wear resistance of articles made from these compositions combined with other outstanding properties normally found in polyoxymethylene compositions make them particularly well suited for applications such as gears, moving parts and fuel tanks.

BEST MODE

Although the best mode of the present invention, i.e. the single best polyoxymethylene composition of the present invention, will depend upon the particular desired end use and the specific requisite combination of properties for that use, the single composition and molding conditions of the present invention that result in a product most preferred for its overall balance of properties is described in detail in Example 20 for compositions containing 30 weight percent polyurethane and in Example 26 for compositions containing 10 weight percent polyurethane. While it is not a part of the present invention, it is preferred to incorporate in the compositions of the present invention about 0.1 weight percent of a polycarbodiimide (or a mixture of polycarbodiimides) having a molecular weight of about 1000 and containing units of the formula

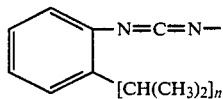

where n has an average value of about 3.

I claim:

1. A thermoplastic polyoxymethylene composition consisting essentially of
    (a) 5-40 weight percent of at least one thermoplastic polyurethane, which polyurethane has a glass transition temperature of lower than 0° C.,
    (b) 0.2-1.0 weight percent of ethylene bis-stearamide, and
    (c) a complemental amount of at least one polyoxymethylene polymer, which polyoxymethylene polymer has a weight average molecular weight of from 20,000 to 100,000,
    wherein said weight percents recited above for components (a) and (b) are each based on the total of components (a), (b) and (c).

2. The composition of claim 1 wherein the quantity of polyurethane is 5-15 weight percent, and the quantity of ethylene bis-stearamide is 0.2-0.4 weight percent.

3. The composition of claim 1 wherein the quantity of polyurethane is 15-40 weight percent, and the quantity of ethylene bis-stearamide is 0.3-1.0 weight percent.

4. The composition of claim 2 wherein the polyurethane is dispersed throughout the polyoxymethylene polymer as discrete particles, and the composition has a Gardner impact value of greater than 9 J.

5. The composition of claim 3 wherein the polyurethane has a glass transition temperature of lower than −15° C., the polyurethane is dispersed throughout the polyoxymethylene polymer as a separate phase having an average cross-sectional size in the minimum dimension of not greater than 0.9 microns, and the composition has an Izod value of greater than 375 J/m.

6. The composition of claim 4 wherein the polyoxymethylene is a homopolymer with a molecular weight of 30,000-70,000.

7. The composition of claim 5 wherein the polyoxymethylene is a homopolymer with a molecular weight of 30,000-70,000.

8. The composition of claim 4 wherein the Gardner impact value is greater than 25 J.

9. The composition of claim 5 wherein the Izod value is greater than 650 J/m.

10. The composition of claim 4 wherein the thermoplastic polyurethane comprises 8 to 12 weight percent of the composition.

11. The composition of claim 5 wherein the thermoplastic polyurethane comprises 25 to 32 weight percent of the composition.

12. The composition of claim 4 wherein the thermoplastic polyurethane is derived from the reaction of butylene adipate, methylene bis(phenylisocyanate) and 1,4-butane diol.

13. The composition of claim 5 wherein the thermoplastic polyurethane is derived from the reaction of butylene adipate, methylene bis(phenylisocyanate) and 1,4-butane diol.

14. A method for improving the mold release and mold deposit characteristics of a thermoplastic polyoxymethylene composition, said composition consisting essentially of:
    (a) 5-40 weight percent of at least one thermoplastic polyurethane, which polyurethane has a glass transition temperature of lower than 0° C., and
    (b) a complemental amount of at least one polyoxymethylene polymer, which polyoxymethylene polymer has a weight average molecular weight of from 20,000 to 100,000,
    said method comprising incorporating into the polyoxymethylene composition 0.2-1.0 weight percent of ethylene bis-stearamide, wherein said weight percents recited for component (a) and for the ethylene bis-stearamide are each based on the total of components (a) and (b) and the ethylene bis-stearamide.

15. The method of claim 14 wherein the quantity of ethylene bis-stearamide is 0.2-0.4 weight percent, and the quantity of polyurethane is 5-15 weight percent.

16. The method of claim 14 wherein the quantity of ethylene bis-stearamide is 0.3-1.0 weight percent, and the quantity of polyurethane is 15-40 weight percent.

17. The method of claim 14 wherein the ethylene bis-stearamide is incorporated into the composition by melt compounding under high shear.

18. Shaped articles made from the composition of claim 1.

19. A method of preparing the shaped articles of claim 18 by injection molding where the mold temperature is 10° to 120° C.

20. The method of claim 19 wherein the mold temperature is 50° to 90° C.